United States Patent
Pan et al.

(10) Patent No.: US 8,508,684 B2
(45) Date of Patent: Aug. 13, 2013

(54) BACKLIGHT MODULE AND LIQUID CRYSTAL DISPLAY MODULE

(75) Inventors: Chih-Liang Pan, Taipei (TW); Jeng-Bin Hsu, Hualien County (TW); Yen-Po Yeh, Chiayi (TW); Yu-Yu Chen, Taipei County (TW); Ching-Feng Chen, Taipei County (TW); Yu-Hsiu Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 419 days.

(21) Appl. No.: 12/898,729

(22) Filed: Oct. 6, 2010

(65) Prior Publication Data
US 2011/0255026 A1    Oct. 20, 2011

(30) Foreign Application Priority Data
Apr. 14, 2010   (TW) .................. 99111613 A

(51) Int. Cl.
G02F 1/1333    (2006.01)
(52) U.S. Cl.
USPC ................................. 349/58; 349/59; 349/60
(58) Field of Classification Search
USPC ...................................................... 349/58–60
See application file for complete search history.

(56) References Cited

U.S. PATENT DOCUMENTS

| | | |
|---|---|---|
| 6,552,761 B1 | 4/2003 | Seo et al. |
| 6,956,637 B2 | 10/2005 | Satonaka |
| 2007/0229726 A1 | 10/2007 | Azuma et al. |

FOREIGN PATENT DOCUMENTS

| | | |
|---|---|---|
| CN | 1512237 | 7/2004 |
| CN | 1591131 | 3/2005 |
| CN | 1928655 | 3/2007 |
| JP | 2003050395 | 2/2003 |
| JP | 2007157500 | 6/2007 |
| JP | 2009076456 | 4/2009 |
| TW | I263468 | 10/2006 |
| TW | I289227 | 11/2007 |
| TW | 200811531 | 3/2008 |
| TW | M329791 | 4/2008 |

OTHER PUBLICATIONS

"First Office Action of China Counterpart Application", issued on Feb. 24, 2011, p. 1-p. 5, in which the listed references were cited.

Primary Examiner — Phu Vu
(74) Attorney, Agent, or Firm — Jianq Chyun IP Office

(57) ABSTRACT

A backlight module includes a tray, a light guide plate, a lighting device, and an optical film set. The tray includes a bottom plate and a side wall connecting an edge of the bottom plate. The side wall includes a plurality of wall portions connected to one another. Some of the wall portions are perpendicular to the bottom plate, and the others are parallel to the bottom plate. The light guide plate is disposed on the bottom plate. The lighting device is disposed at a light incident side of the light guide plate. The optical film set disposed on the light guide plate leans against the side wall.

32 Claims, 22 Drawing Sheets

BACKLIGHT MODULE AND LIQUID CRYSTAL DISPLAY MODULE

CROSS-REFERENCE TO RELATED APPLICATION

This application claims the priority benefit of Taiwan application serial no. 99111613, filed on Apr. 14, 2010. The entirety of the above-mentioned patent application is hereby incorporated by reference herein and made a part of this specification.

BACKGROUND OF THE INVENTION

1. Field of the Invention

The invention relates to a backlight module and a liquid crystal display (LCD) module. More particularly, the invention relates to a backlight module having an integrated tray and an LCD module having an integrated tray.

2. Description of Related Art

Recently, with continuing maturation of electro-optical technology and semiconductor fabrication, development of flat display devices is booming. Among the flat display devices, LCD devices characterized by low voltage operation, non-radiation, light weight, and compactness gradually replace conventional cathode ray tube (CRT) display devices and become the mainstream products of the display devices.

In general, the LCD device has an iron front frame structure which covers components of an LCD panel and a backlight module. By contrast, with the specific demand on compactness, LCD devices applied to notebook computers are different from those applied to other LCD devices in terms of mechanical design or optical design. Therefore, the LCD devices applied to the notebook computers have an iron back frame structure.

In such an LCD device, a metallic back frame serves as a plate-shaped holder on which a reflective film, a light guide plate, an optical film set, and the LCD panel are sequentially stacked. These components are then wrapped up by a flexible encapsulating material. However, a number of components are required in the iron back frame structure, and thickness of the products having the iron back frame structure cannot be reduced in an effective manner. Thus, manufacturing costs and difficulty in assembly are increased.

SUMMARY OF THE INVENTION

The invention is directed to a backlight module which has an integrated tray structure and is characterized by small thickness.

The invention is also directed to an LCD module of which a backlight module has small thickness.

In an embodiment of the invention, a backlight module including a tray, a light guide plate, a lighting device, and an optical film set is provided. The tray includes a bottom plate and a side wall connecting an edge of the bottom plate. The side wall of the tray includes a first wall portion, a second wall portion, a third wall portion, a fourth wall portion, and a fifth wall portion. The first, the third, and the fifth wall portions are substantially perpendicular to the bottom plate of the tray. The second and the fourth wall portions are substantially parallel to the bottom plate of the tray and extended out of the tray. The second wall portion is connected between the first wall portion and the third wall portion. The fourth wall portion is connected between the third wall portion and the fifth wall portion. The light guide plate is disposed on the bottom plate of the tray. The lighting device is disposed at a light incident side of the light guide plate. The optical film set is disposed on the light guide plate, and the second wall portion leans against the optical film set.

In an embodiment of the invention, an LCD module including a tray, a light guide plate, a lighting device, an optical film set, an LCD panel, and a flexible encapsulating material is provided. The tray includes a bottom plate and a side wall connecting an edge of the bottom plate. The side wall of the tray includes a first wall portion, a second wall portion, a third wall portion, a fourth wall portion, and a fifth wall portion. The first, the third, and the fifth wall portions are substantially perpendicular to the bottom plate of the tray. The second and the fourth wall portions are substantially parallel to the bottom plate of the tray and extended out of the tray. The second wall portion is connected between the first wall portion and the third wall portion. The fourth wall portion is connected between the third wall portion and the fifth wall portion. The light guide plate is disposed on the bottom plate. The lighting device is disposed at a light incident side of the light guide plate. The optical film set is disposed on the light guide plate, and the second wall portion leans against the optical film set. The LCD panel is disposed over the optical film set, and the fourth wall portion leans against the LCD panel. The flexible encapsulating material covers a portion of the LCD panel and a portion of the bottom plate of the tray, so as to fix the LCD panel and the tray together.

According to an embodiment of the invention, the side wall of the tray surrounds the light guide plate but exposes the light incident side of the light guide plate. The backlight module further includes a back frame surrounding and leaning against the tray. A bottom surface of the tray and a bottom surface of the back frame are substantially coplanar.

According to an embodiment of the invention, the flexible encapsulating material surrounds the back frame and fixes the LCD panel, the back frame, and the tray together.

According to an embodiment of the invention, the back frame includes a bottom plate and a side wall. The bottom plate of the back frame is substantially coplanar with the bottom plate of the tray, and the bottom plate of the back frame surrounds the bottom plate of the tray. The side wall of the back frame is perpendicular to the bottom plate of the back frame. Besides, the side wall of the back frame connects the bottom plate of the back frame and surrounds the side wall of the tray.

According to an embodiment of the invention, the backlight module further includes a cushion material leaning between the bottom plate of the back frame and the second wall portion of the side wall of the tray or between the bottom plate of the back frame and the fourth wall portion of the side wall of the tray.

According to an embodiment of the invention, the cushion material is adhesive, so as to adhere the bottom plate of the back frame and the side wall of the tray.

According to an embodiment of the invention, a side of the side wall of the back frame away from the bottom plate of the back frame is bent toward the light guide plate to form a supporting wall portion. The supporting wall portion is substantially parallel to the bottom plate of the back frame and leans against the second wall portion or the fourth wall portion of the side wall of the tray.

According to an embodiment of the invention, the side wall of the back frame has a first portion corresponding to the light incident side of the light guide plate, and a side of the first portion away from the bottom plate of the back frame is bent toward the light guide plate to form a clamping wall portion, so as to form a light source accommodation space between the clamping wall portion and the bottom plate of the back frame.

The light incident side of the light guide plate is inserted into the light source accommodation space.

According to an embodiment of the invention, the lighting device is located in the light source accommodation space and disposed on the clamping wall portion.

According to an embodiment of the invention, the side wall of the tray surrounds the light guide plate, and the side wall of the tray located at the light incident side includes a sixth wall portion substantially perpendicular to the bottom plate of the tray. A height of a top of the sixth wall portion relative to a height of the bottom plate of the tray is substantially less than a height of a top of the third wall portion relative to the height of the bottom plate of the tray. The backlight module further includes a holder which is located at the light incident side, and the holder and the sixth portion lean against each other.

According to an embodiment of the invention, the holder includes a first leaning wall and a second leaning wall. The first leaning wall is substantially parallel to and leans against the sixth wall portion. The second leaning wall extends from the first leaning wall to the light incident side of the light guide plate. Besides, the second leaning wall and the fourth wall portion of the tray together hold the LCD panel. A light source accommodation space is formed between the second leaning wall, the bottom plate of the tray, and the sixth wall portion, and the light incident side of the light guide plate is clamped by the second leaning wall and the bottom plate of the tray.

According to an embodiment of the invention, the lighting device includes a holding board and a light emitting device. The holding board is disposed on the second leaning wall. The light emitting device is disposed on the holding board and emits a light beam into the light guide plate.

According to an embodiment of the invention, the second wall portion has a first surface and a second surface opposite to the first surface. The optical film set is located on the first surface. The backlight module further includes a positioning element disposed between the optical film set and the first surface. The positioning element has a positioning protrusion. The optical film set has a positioning hole in which the positioning protrusion is located.

According to an embodiment of the invention, the second wall portion has a first surface, a second surface opposite to the first surface, and a through hole communicating the first surface and the second surface. The optical film set is located on the first surface. The backlight module further includes a positioning element disposed on the second surface. The positioning element has a positioning protrusion passing through the through hole and protruding from the first surface, and the positioning protrusion is located in a positioning hole of the optical film set.

According to an embodiment of the invention, the holder further includes an adhesive layer disposed between the second leaning wall and the LCD panel.

According to an embodiment of the invention, the holder further includes a holding portion parallel to the second leaning wall and extending toward a direction away from the LCD panel. The LCD module further includes a circuit board electrically connected to the LCD panel, and the circuit board is disposed on the holding portion.

According to an embodiment of the invention, the LCD module further includes a holder and another cushion material. The holder is disposed on the back frame and located at the light incident side of the light guide plate. Said another cushion material is disposed on the clamping wall portion of the side wall of the back frame and leans between the holder and the LCD panel.

According to an embodiment of the invention, the holder has a stop board extending toward a direction away from the lighting device. Said another cushion material is located between the stop board and the LCD panel.

Based on the above, the tray in the backlight module and the LCD module holds components and reflects light according to the embodiments of this invention, such that the conventional reflective film and the back frame structure can be effectively integrated in this invention. Accordingly, the backlight module and the LCD module that are assembled can have reduced thickness, compact appearance, and strong structural strength.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
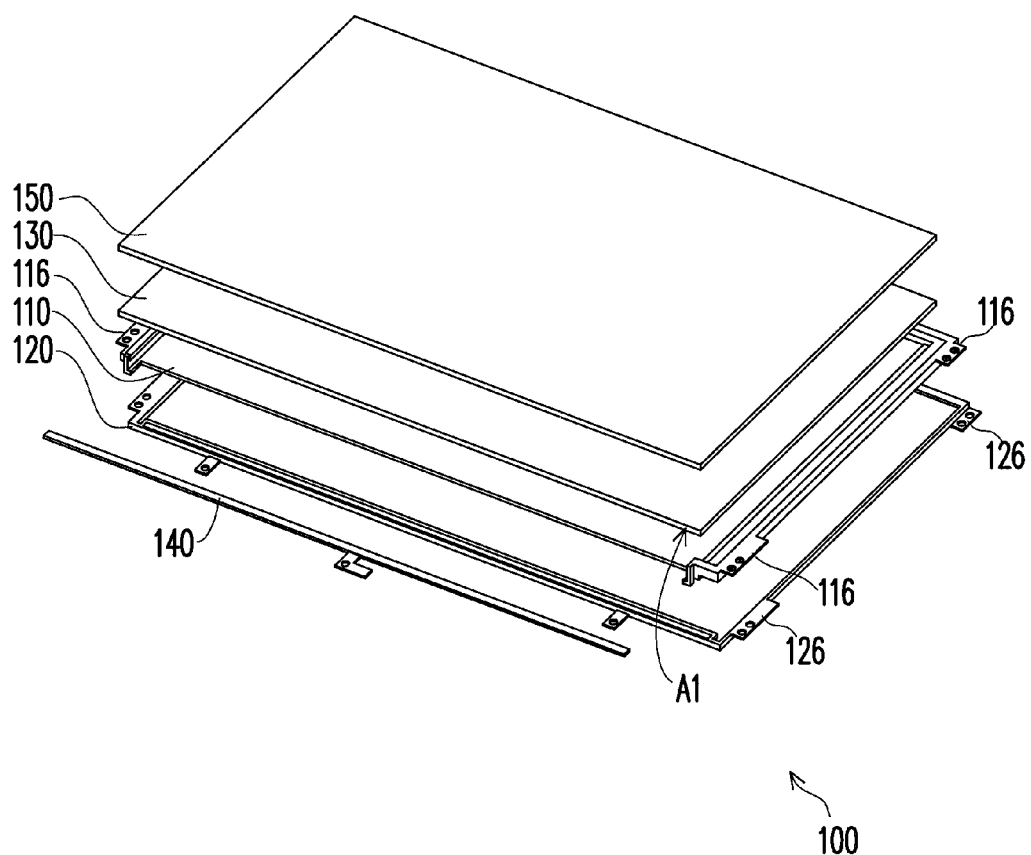
FIG. 1 is an exploded view illustrating a backlight module according to an embodiment of the invention.

FIG. 1 is an exploded view illustrating a backlight module according to an embodiment of the invention. As shown in FIG. 1, a backlight module 100 includes a tray 110, a back frame 120, a light guide plate 130, a lighting device 140, and an optical film set 150. The tray 110 and the back frame 120 lean against each other and are assembled. The back frame 120 surrounds the tray 110. After assembly of the backlight module 100 is completed, a bottom surface of the tray 110 and a bottom surface of the back frame 120 are substantially coplanar. The light guide plate 130 is disposed on the tray 110. The lighting device 140 is disposed at a light incident side A1 of the light guide plate 130. The optical film set 150 is disposed on the light guide plate 130.

Figure 2:
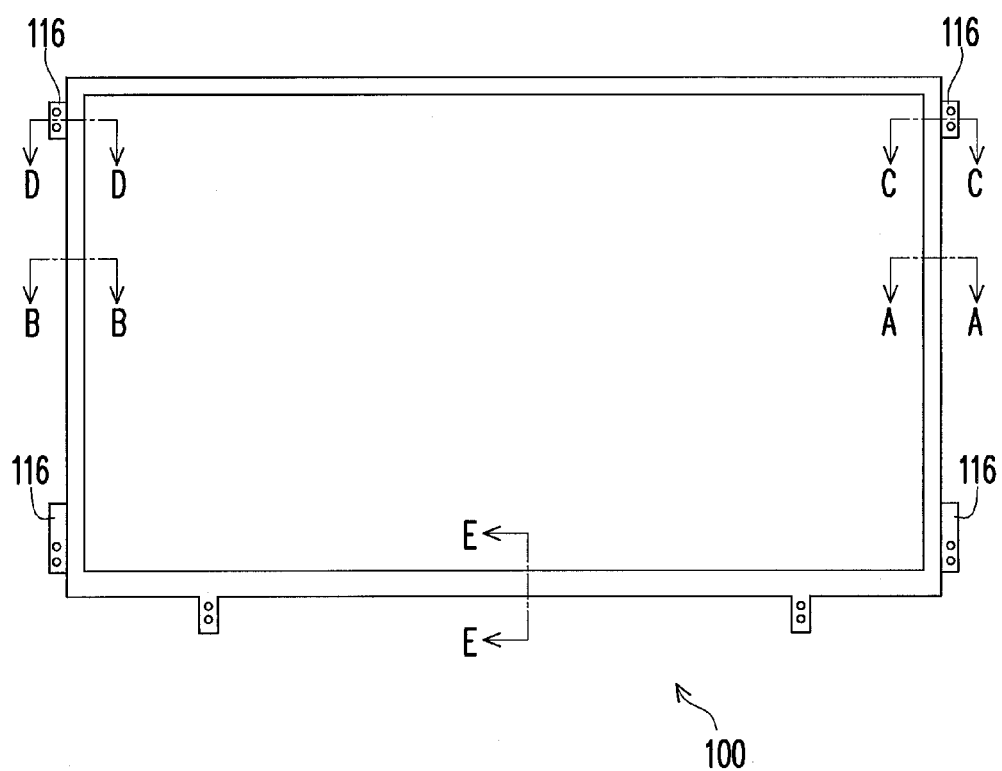
FIG. 2 is a top view illustrating the backlight module depicted in FIG. 1.
Figure 3A:
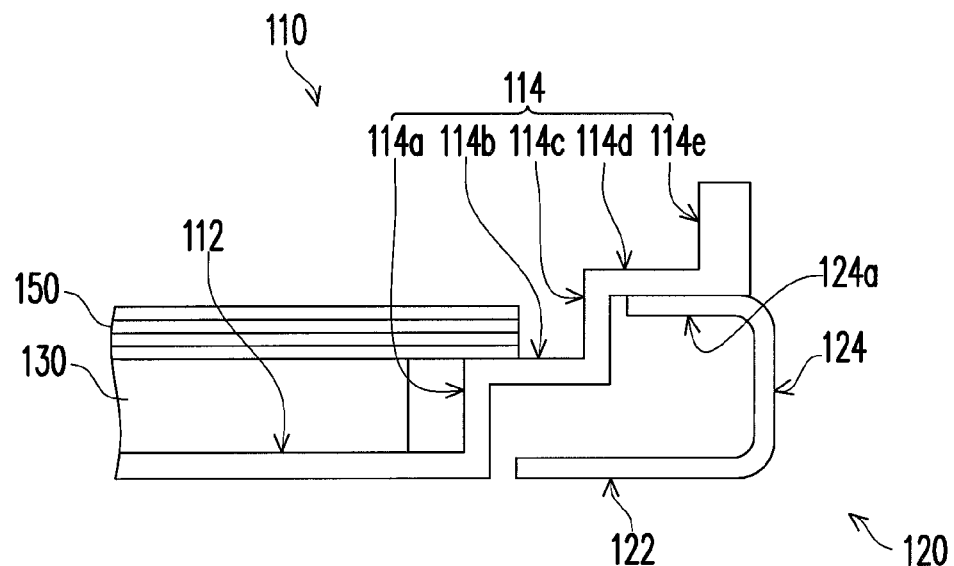
FIG. 3A is a cross-sectional view illustrating the backlight module depicted in FIG. 2 along a line segment A-A.
Figure 3B:
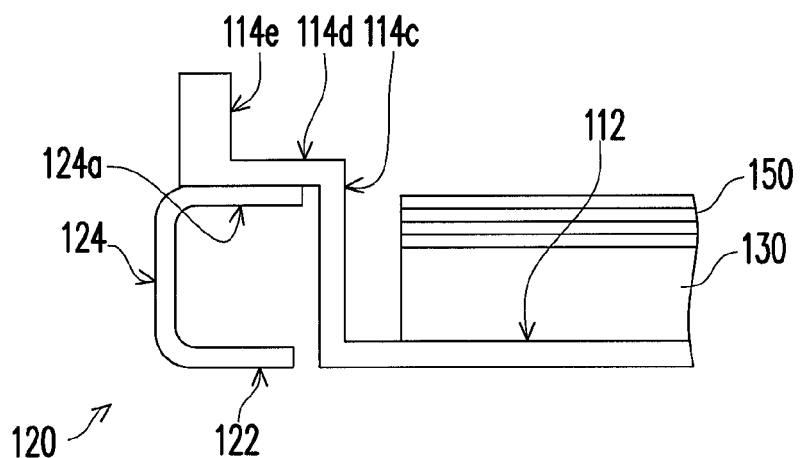
FIG. 3B is a cross-sectional view illustrating the backlight module depicted in FIG. 2 along a line segment B-B.

FIG. 2 is a top view illustrating the backlight module depicted in FIG. 1. FIG. 3A is a cross-sectional view illustrating the backlight module depicted in FIG. 2 along a line segment A-A. FIG. 3B is a cross-sectional view illustrating the backlight module depicted in FIG. 2 along a line segment B-B. With reference to FIG. 1, FIG. 2, FIG. 3A, and FIG. 3B, the tray 110 includes a bottom plate 112 and a side wall 114 connecting an edge of the bottom plate 112. The light guide plate 130 is substantially disposed on the bottom plate 112 of the tray 110, and the side wall 114 of the tray 110 surrounds three sides of the light guide plate 130 and exposes the light incident side A1 of the light guide plate 130.

The side wall 114 of the tray 110 includes a first wall portion 114a, a second wall portion 114b, a third wall portion 114c, a fourth wall portion 114d, and a fifth wall portion 114e. The first, the third, and the fifth wall portions 114a, 114c, and 114e are substantially perpendicular to the bottom plate 112 of the tray 110. The second and the fourth wall portions 114b and 114d are substantially parallel to the bottom plate 112 of the tray 110 and extended out of the tray 110. The second wall portion 114b is connected between the first and the third wall portions 114a and 114c, and the second wall portion 114b leans against the optical film set 150. The fourth wall portion 114d is connected between the third wall portion 114c and the fifth wall portion 114e.

Note that the tray 110 is made of white foam-type polyethylene terephthalate (PET), and the tray 110 can be processed to have different thicknesses. Here, the minimum thickness of the tray 110 can reach 0.3 mm. The tray 110 is not only apt to be processed but also equipped with the light-reflecting function of a conventional reflective film. Thereby, the conventional reflective film and the tray are integrated, such that the tray 110 can simultaneously hold relevant components and reflect light. In this embodiment, the thickness of the bottom plate 112 of the tray 110 can be smaller than the thickness of the side wall 114 of the tray 110, such that the tray 110 can meet relevant requirements. Besides, the bottom plate 112 of the tray 110 and the side wall 114 of the tray 110 are integrally formed by one individual work piece. As such, the tray 110 can have small thickness without sacrificing structural strength.

Figure 4A:
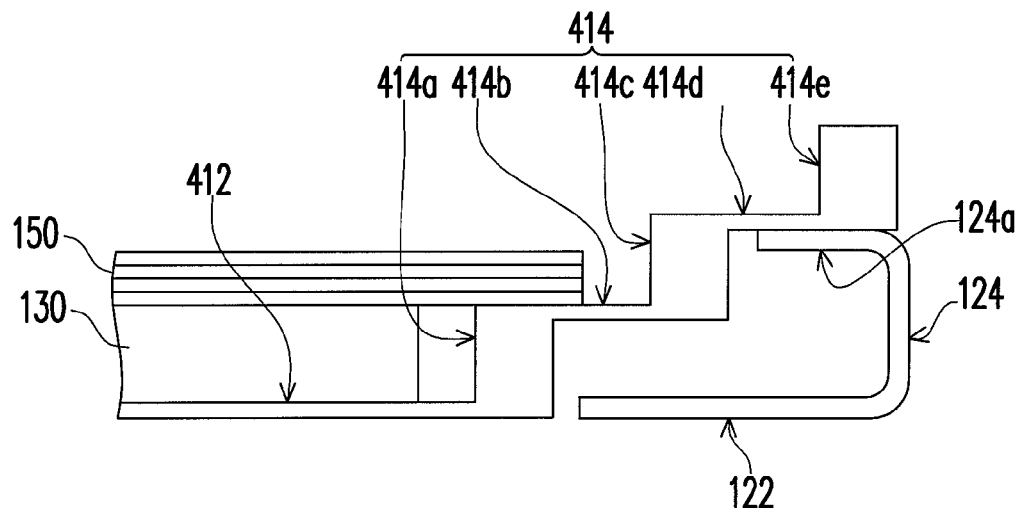
FIG. 4A to 4E are cross-sectional views illustrating a tray in a backlight module according to another embodiment of the invention.
Figure 4B:
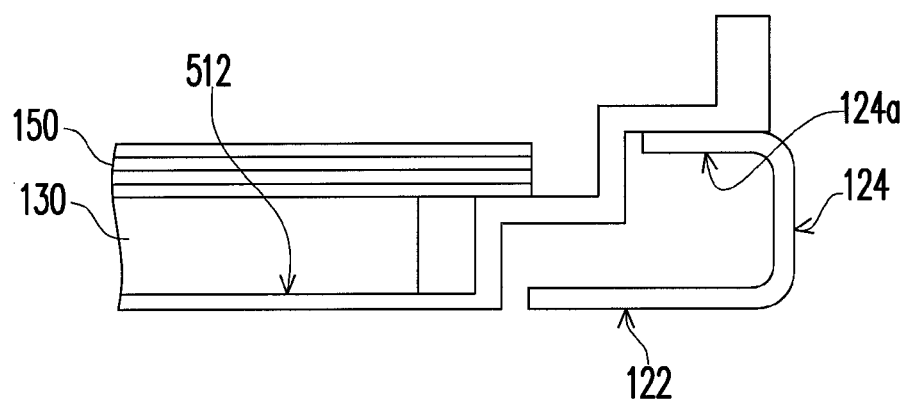
Figure 4C:
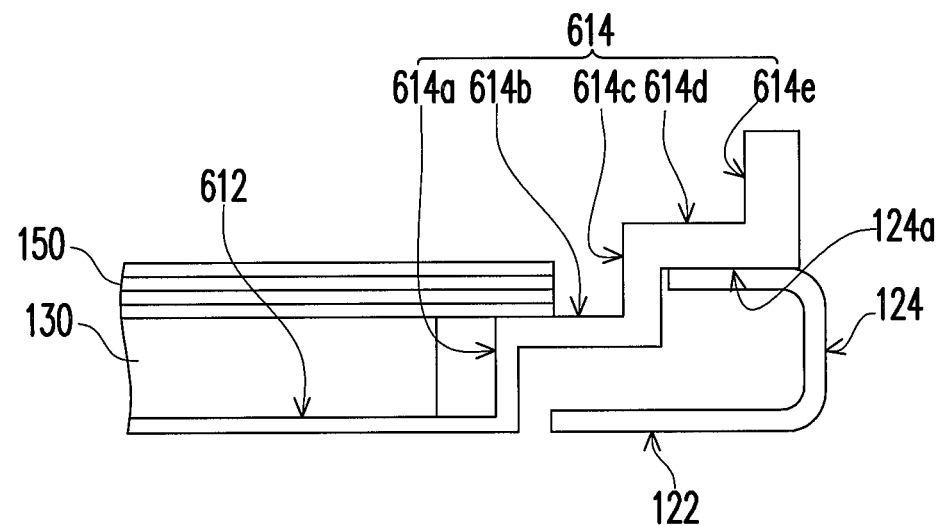
Figure 4D:
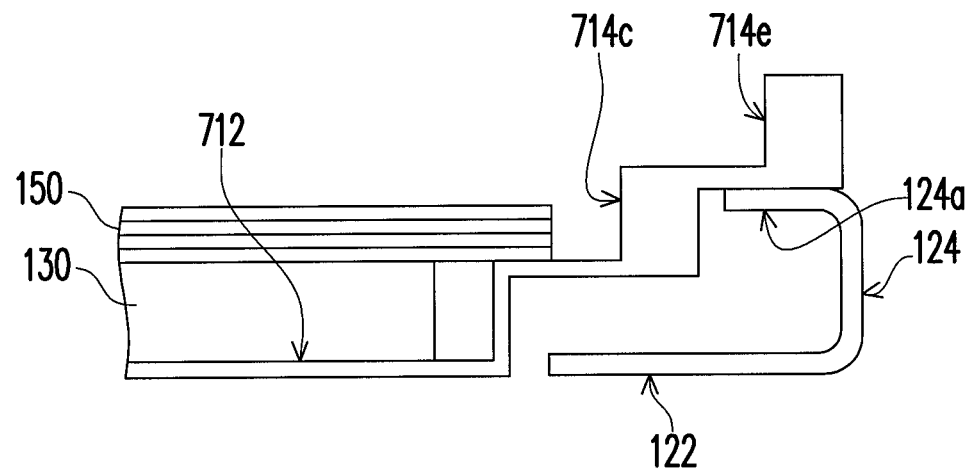
Figure 4E:
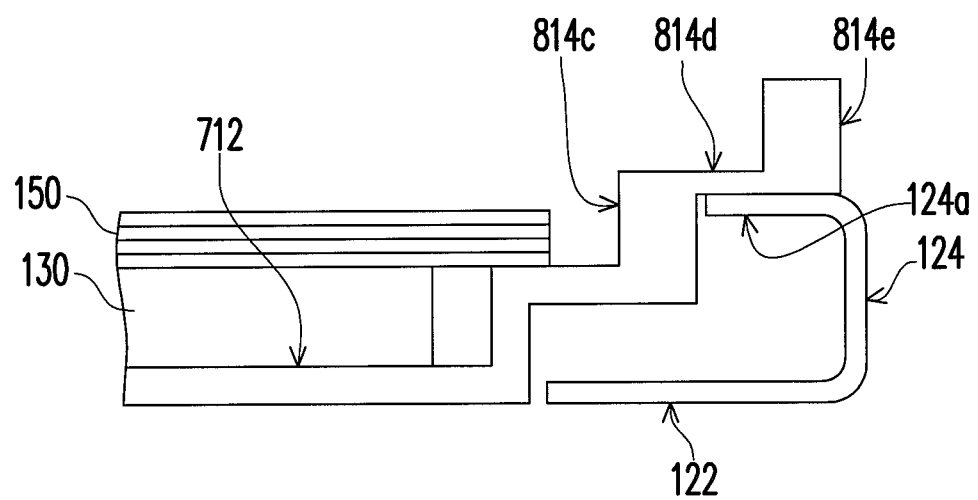

For instance, FIG. 4A to FIG. 4E are cross-sectional views illustrating a tray in a backlight module according to another embodiment of the invention. Different relationship between the thickness of the bottom plate of the tray and the thickness of the side wall of the tray is shown in FIG. 4A to FIG. 4E. As depicted in FIG. 4A, the bottom plate 412, the second wall portion 414b, and the fourth wall portion 414d have the minimum thickness; the first wall portion 414a, the third wall portion 414c, and the fifth wall portion 414e have the maximum thickness. In FIG. 4B, the bottom plate 512 has the minimum thickness. In FIG. 4C, the bottom plate 612 has the minimum thickness, and the thickness of the first wall portion 614a, the thickness of the second wall portion 614b, the thickness of the third wall portion 614c, the thickness of the fourth wall portion 614d, and the thickness of the fifth wall portion 614e sequentially increase. In FIG. 4D, the third wall portion 714c and the fifth wall portion 714e have the maximum thickness. In FIG. 4E, the thickness of the fourth wall portion 814d is less than the thickness of the third wall portion 814c and the thickness of the fifth wall portion 814e. Note that the above-mentioned FIG. 4A to FIG. 4E represent some embodiments of the invention, which should not be construed as a limitation to this invention. The invention is applicable as long as the backlight module is miniaturized and the structural strength between the bottom plate and the side wall of the tray is maintained.

In FIG. 3A and FIG. 3B illustrating this embodiment, the wall portions 114a, 114b, 114c, 114d, and 114e at one side of the tray 110 have a triple-folded structure, while the wall portions 114c, 114d, and 114e at the other side of the tray 110 have a double-folded structure. The arrangement of the wall portions 114a, 114b, 114c, 114d, and 114e is not limited in this invention and is determined by designers based on actual requirements.

In this embodiment, the back frame 120 includes a bottom plate 122 and a side wall 124. The bottom plate 122 of the back frame 120 is substantially coplanar with the bottom plate 112 of the tray 110, and the bottom plate 122 of the back frame 120 surrounds the bottom plate 112 of the tray 110. The side wall 124 is perpendicular to the bottom plate 122 of the back frame 120. Besides, the side wall 124 of the back frame 120 connects the bottom plate 114 of the back frame 110 and surrounds the side wall 114 of the tray 110.

According to this embodiment, a side of the side wall 124 of the back frame 120 away from the bottom plate 122 of the back frame 120 is bent toward the light guide plate 130 (i.e. toward the inside of the backlight module 100) to form a supporting wall portion 124a. The supporting wall portion 124a is substantially parallel to the bottom plate 122 of the back frame 120 and leans against the fourth wall portion 114d of the side wall 114 of the tray 110. An adhesive material (not shown) is disposed between the supporting wall portion 124a and the fourth wall portion 114d, such that the back frame 120 and the tray 110 can lean against each other and can be adhered together. Besides, in another embodiment which is not depicted in the drawings, the supporting wall portion can also lean against the second wall portion 114b of the side wall 114 of the tray 110 and can be adhered to the second wall portion 114b.

Figure 5A:
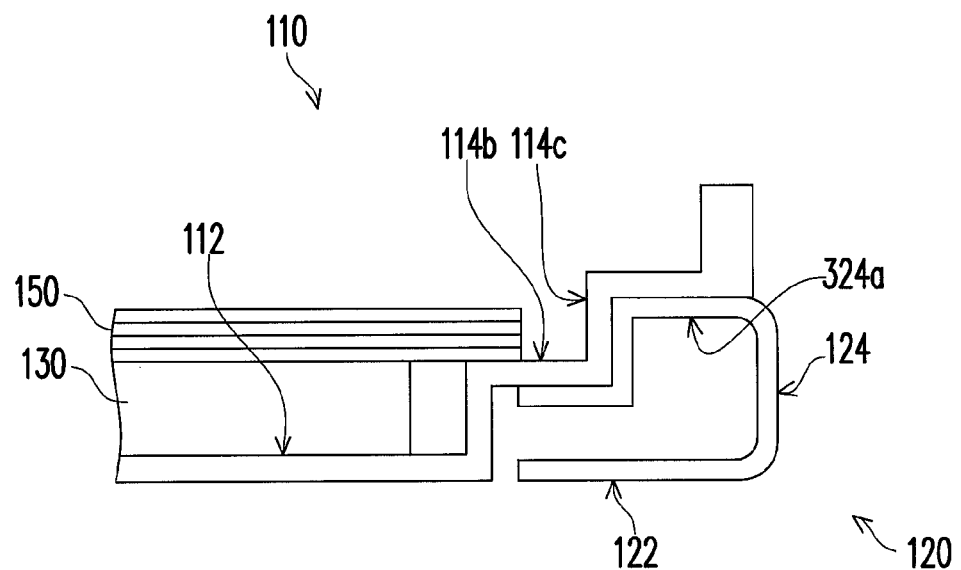
FIG. 5A and FIG. 5B are partial cross-sectional views illustrating a tray and a back frame in a backlight module according to another embodiment of the invention.
Figure 5B:
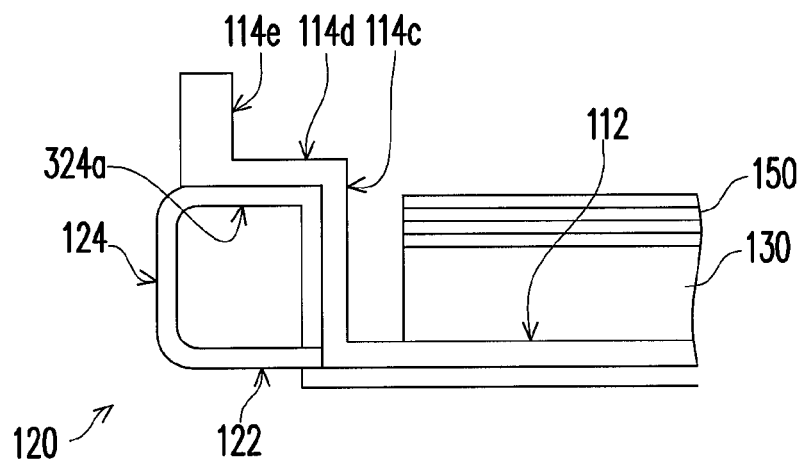

In this invention, the bottom plate and the side wall of the back frame can provide the bottom plate and the side wall of the tray with satisfactory structural support. FIG. 5A and FIG. 5B are partial cross-sectional views illustrating a tray and a back frame in a backlight module according to another embodiment of the invention. With reference to FIG. 5A and FIG. 5B, parts of the supporting wall portion 324a of this embodiment are extended and bent along an outer side of the third wall portion 114c and an outer side of the second wall portion 114b, and the other parts of the supporting wall portion 324a are extended along the outer side of the third wall portion 114c in a downward manner and contact the bottom plate 122 of the back frame 120. Likewise, in another embodiment which is not depicted in the drawings, the supporting wall portion can be extended and bent along the outer side of the third wall portion and the outer side of the second wall portion, and the supporting wall portion then contacts the bottom plate of the back frame in a downward manner. Alternatively, the bottom plate of the back frame is extended and bent along the side wall of the tray, and the bottom plate of the back frame then contacts the supporting wall portion. This embodiment is applicable as long as the structural arrangement of the bottom plate 122 and the side wall 124 of the back frame 120 strengths the structure of the backlight module 100 without affecting miniaturization of the backlight module 100.

Figure 6A:
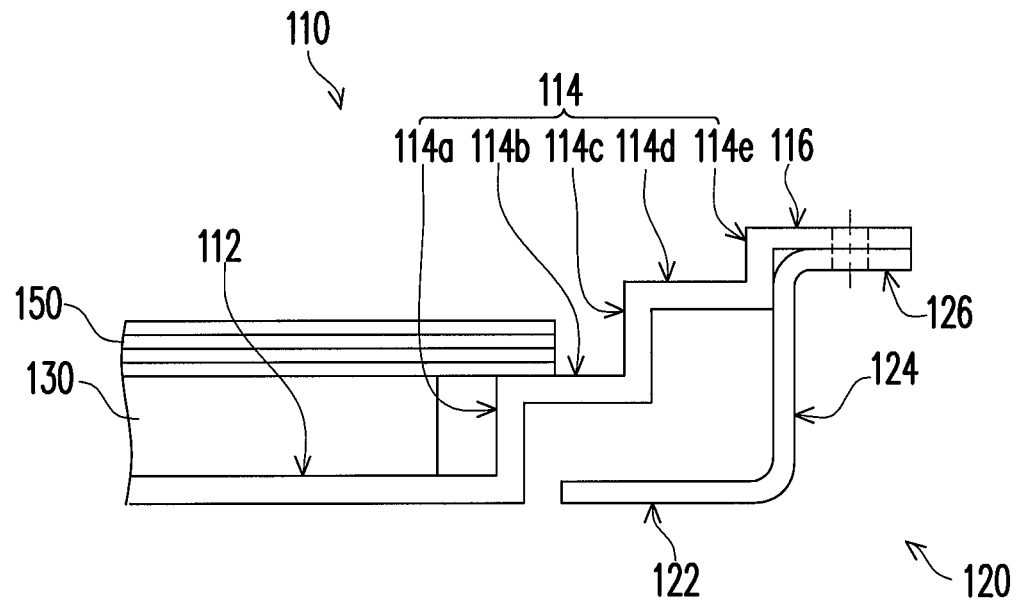
FIG. 6A and FIG. 6B are cross-sectional views illustrating the backlight module depicted in FIG. 2 respectively along a line segment C-C and a line segment D-D.
Figure 6B:
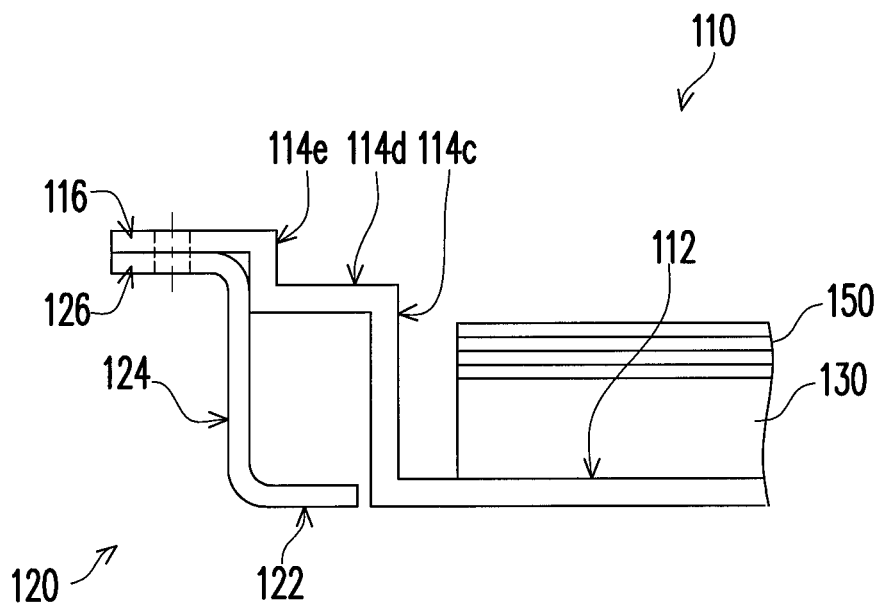

FIG. 6A and FIG. 6B are cross-sectional views illustrating the backlight module depicted in FIG. 2 respectively along a line segment C-C and a line segment D-D. With reference to FIG. 1, FIG. 2, FIG. 6A, and FIG. 6B, the tray 110 of this embodiment further includes a plurality of first ear-like portions 116 extending out of the tray 110 from the fifth wall portion 114e of the side wall 114 of the tray 110. The back frame 120 further includes a plurality of second ear-like portions 126 extending out of the back frame 120 from the side wall 124 of the back frame 120. The second ear-like portions 126 correspond to and lean against the first ear-like portions 116. By securing screws into corresponding holes on the first ear-like portions 116 and on the second ear-like portions 126 or by disposing the adhesive material (e.g. a double-sided adhesive tape, an adhesive tape, and so on) between the first ear-like portions 116 and the second ear-like portions 126, the back frame 120 and the tray 110 can be bonded together.

Figure 7A:
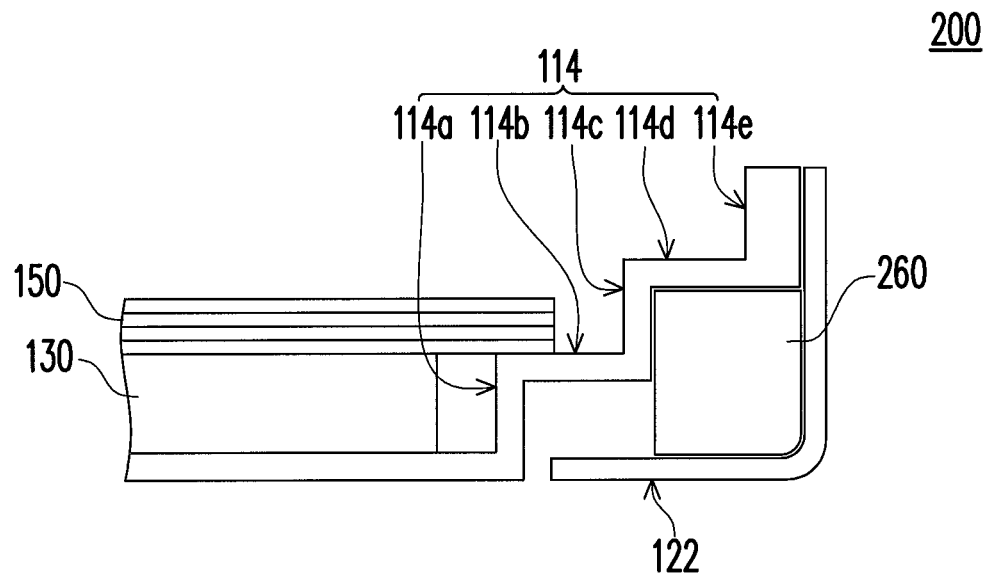
FIG. 7A and FIG. 7B are partial cross-sectional views illustrating a backlight module according to another embodiment of the invention.
Figure 7B:
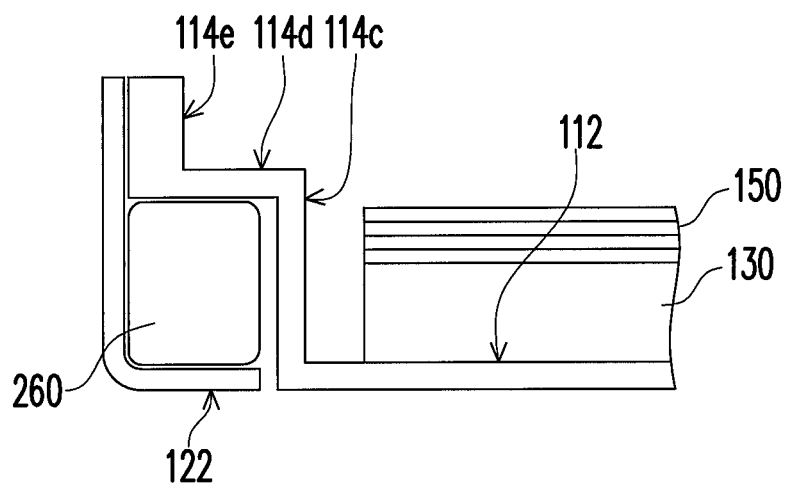

FIG. 7A and FIG. 7B are partial cross-sectional views illustrating a backlight module according to another embodiment of the invention. With reference to FIG. 7A and FIG. 7B, the backlight module 200 which is different from the backlight module 100 described in the above embodiment further includes a first cushion material 260 (e.g. a rubber pad) leaning between the bottom plate 122 of the back frame 120 and the fourth wall portion 114d of the side wall 114 of the tray 110, such that the tray 110 leans against the back frame 120 through the first cushion material 260. Besides, the first cushion material 260 can be adhesive, so as to adhere the bottom plate 122 of the back frame 120 and the side wall 114 of the tray 110. In another embodiment which is not depicted in the drawings, the first cushion material 260 can also lean against the bottom plate 122 of the back frame 120, the second wall portion 114b, and the fourth wall portion 114d. In other words, the first cushion material 260 of this embodiment can be changed based on structural requirements of the tray 110 and the back frame 120. As described above, the invention is applicable as long as the tray 110 and the back frame 120 lean against each other and are assembled together.

In addition, the cushion material can also lean between the bottom plate 122 of the back frame 120 and the second wall portion 114b of the side wall 114 of the tray 110 according to another embodiment which is not depicted in the drawings, and the effect achieved in the previous embodiment can be accomplished in this embodiment as well.

Figure 8:
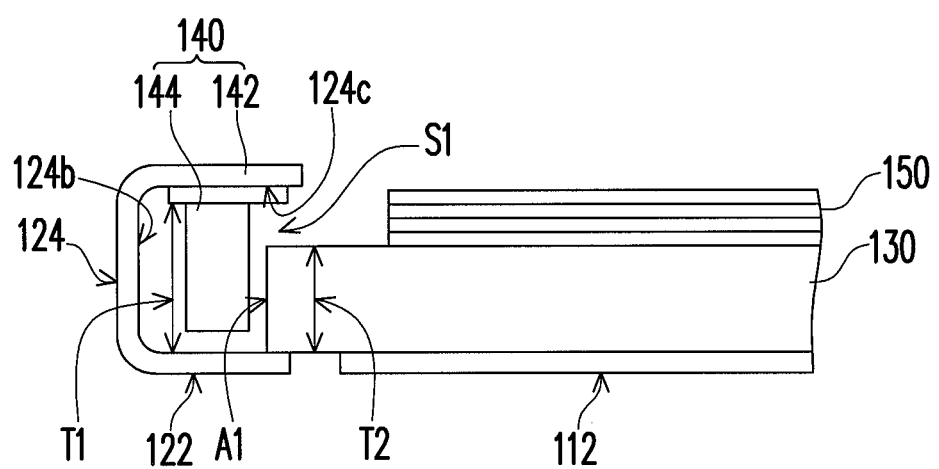
FIG. 8 is a cross-sectional view illustrating the backlight module depicted in FIG. 2 along a line segment E-E.

FIG. 8 is a cross-sectional view illustrating the backlight module depicted in FIG. 2 along a line segment E-E. Please refer to FIG. 2 and FIG. 8. In this embodiment, the side wall 124 of the back frame 120 has a first portion 124b corresponding to the light incident side A1 of the light guide plate 130, and a side of the first portion 124b away from the bottom plate 122 of the back frame 120 is bent toward the light guide plate 130 to form a clamping wall portion 124c, so as to form a light source accommodation space S1 between the clamping wall portion 124c and the bottom plate 122 of the back frame 120.

The light incident side A1 of the light guide plate 130 is inserted into the light source accommodation space S1. The lighting device 140 is located in the light source accommodation space S1.

The lighting device 140 includes a holding board 142 and a light emitting diode (LED) 144 disposed on the holding board 142. Here, the holding board 142 is disposed on the clamping wall portion 124c, and the LED 144 faces the light incident side A1 of the light guide plate 130. In this embodiment, a depth T1 of the light source accommodation space S1 is slightly greater than a thickness T2 of the light guide plate 130. The lighting device 140 is placed upside down in the light source accommodation space S1, such that the holding board 142 disposed on the clamping wall portion 124c can be accommodated between the light guide plate 130 and the clamping wall portion 124c. Thereby, the thickness of the backlight module 100 is not increased by stacking the holding board 142 and the light guide plate 130.

Figure 9:
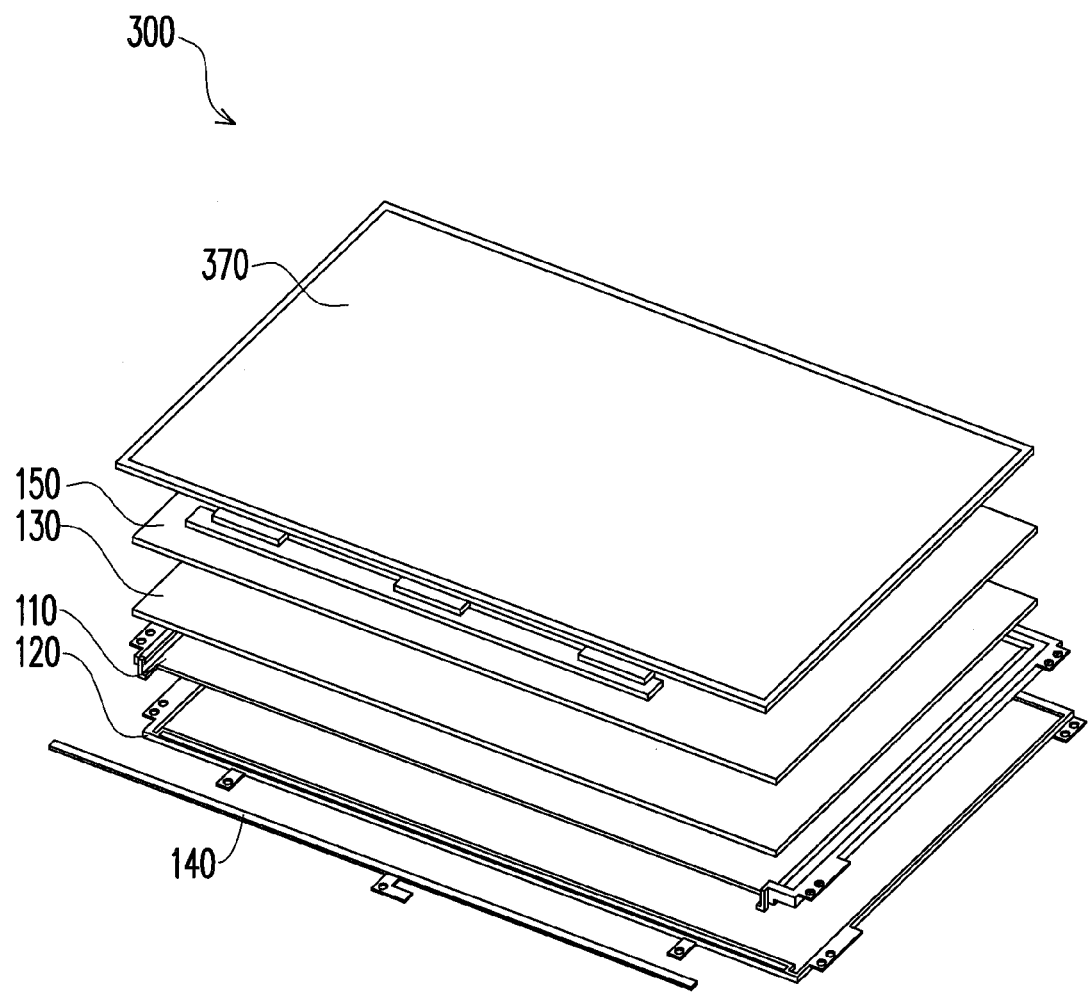
FIG. 9 is an exploded view illustrating an LCD module according to another embodiment of the invention.
Figure 10:
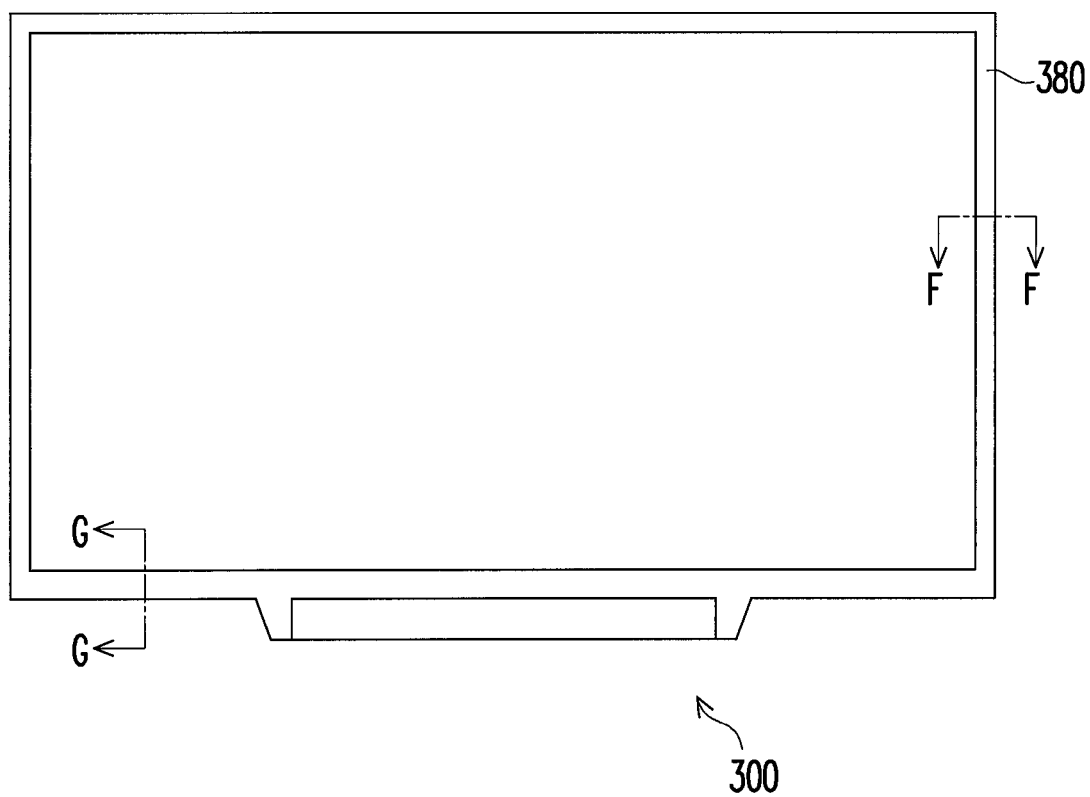
FIG. 10 is a top view illustrating the LCD module depicted in FIG. 9.
Figure 11:
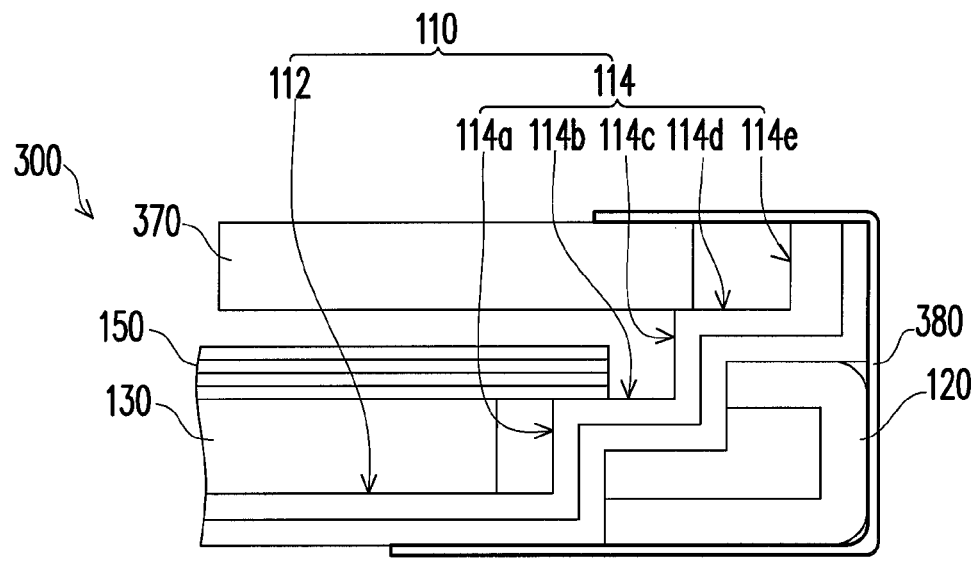
FIG. 11 is a cross-sectional view illustrating the LCD module depicted in FIG. 10 along a line segment F-F.

FIG. 9 is an exploded view illustrating an LCD module according to another embodiment of the invention. FIG. 10 is a top view illustrating the LCD module depicted in FIG. 9. FIG. 11 is a cross-sectional view illustrating the LCD module depicted in FIG. 10 along a line segment F-F. As indicated in FIG. 9 to FIG. 11, some of the components in the LCD module 300 are the same as those in the backlight module 100 in the previous embodiment, and therefore no further description is provided herein. The difference between these two embodiments lies in that the LCD module 300 further includes an LCD panel 370 and an adhesive tape 380. The LCD panel 370 is disposed over the optical film set 150. Besides, the LCD panel 370 leans against the fourth wall portion 114d of the side wall 114 of the tray 110. The adhesive tape 380 surrounds the back frame 120 and covers a portion of the LCD panel 370 and a portion of the bottom plate 112 of the tray 110, so as to fix the LCD panel 370, the back frame 120, and the tray 110 together. The invention does not pose a limitation to the material that surrounds the back frame 120 and covers a portion of the LCD panel 370 and a portion of the bottom plate 112 of the tray 110. In other embodiments which are not depicted in the drawings, other appropriate flexible encapsulating materials can be used to replace the adhesive tape 380.

Figure 12:
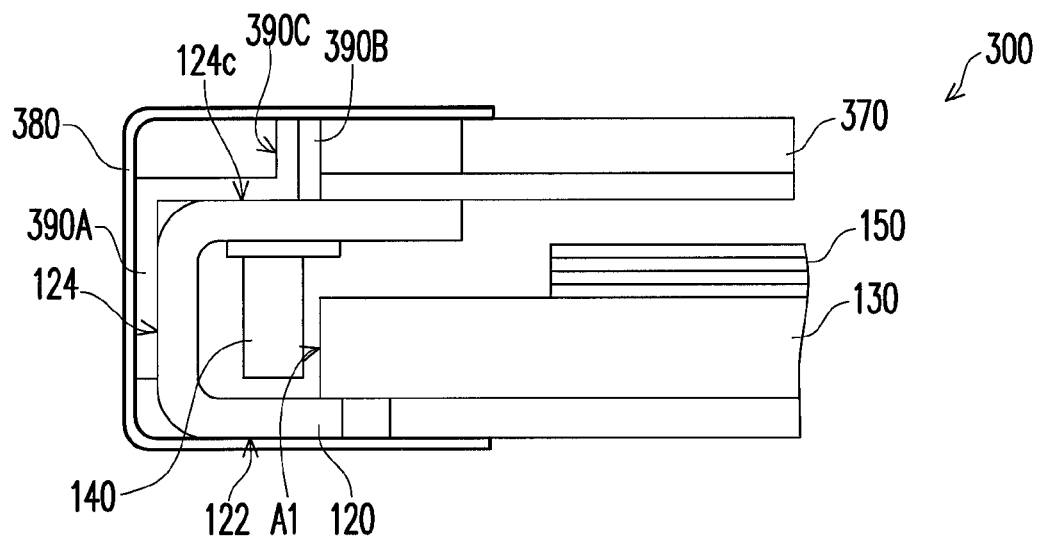
FIG. 12 is a cross-sectional view illustrating the LCD module depicted in FIG. 10 along a line segment G-G.

FIG. 12 is a cross-sectional view illustrating the LCD module depicted in FIG. 10 along a line segment G-G. In FIG. 12, the LCD module 300 of this embodiment further includes a holder 390A and a second cushion material 390B. The holder 390A can be welded to the back frame 120. Besides, the holder 390A is located at the light incident side A1 of the light guide plate 130. The holder 390A has a stop board 390C extending toward a direction away from the lighting device 140. The second cushion material 390B is disposed on the clamping wall portion 124c of the side wall 124 of the back frame 120. In addition, the second cushion material 390B leans between the holder 390A and the LCD panel 370 for fixing the LCD panel 370 and preventing damages caused by collision between the LCD panel 370 and the holder 390A.

Figure 13:
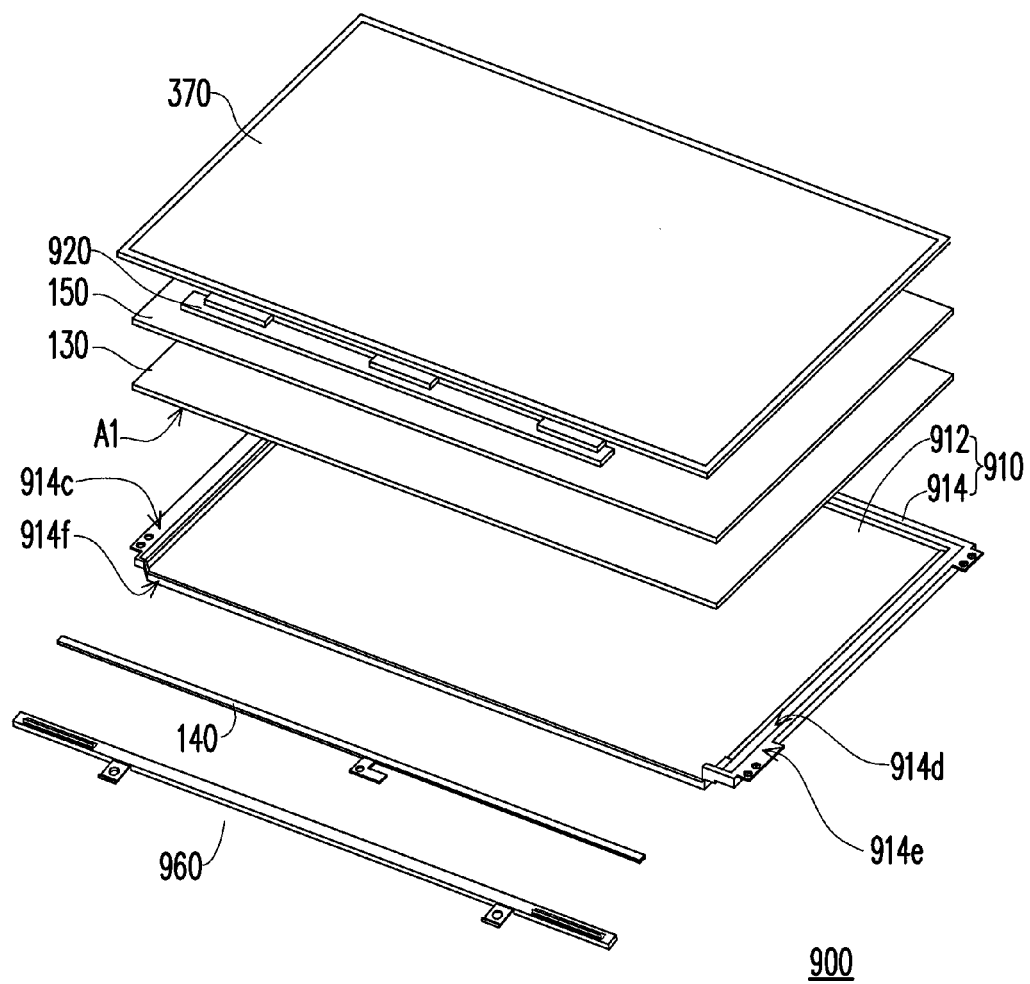
FIG. 13 is an exploded view illustrating an LCD module according to another embodiment of the invention.

FIG. 13 is an exploded view illustrating an LCD module according to another embodiment of the invention. Different from the above embodiment, the embodiment depicted in FIG. 13 indicates that the side wall 914 of the tray 910 in the LCD module 900 surrounds the light guide plate 130, and the side wall 914 includes a sixth wall portion 914f which is located at the light incident side A1 of the light guide plate 130 and is substantially perpendicular to the bottom plate 912. Note that a height of a top of the sixth wall portion 914f relative to a height of the bottom plate 912 is substantially less than a height of a top of the third wall portion 914c relative to the height of the bottom plate 912. In an alternative, the height of the top of the sixth wall portion 914f relative to the height of the bottom plate 912 is substantially less than a height of a top of the fifth wall portion 914e relative to the height of the bottom plate 912. That is to say, in the tray 910 of this embodiment, the height of the sixth wall portion 914f at the light incident side A1 of the light guide plate 130 is slightly less than the height of the side wall 914 at the other three sides, while the height of the side wall 914 at the other three sides of the light guide plate 130 is substantially the same.

Figure 14:
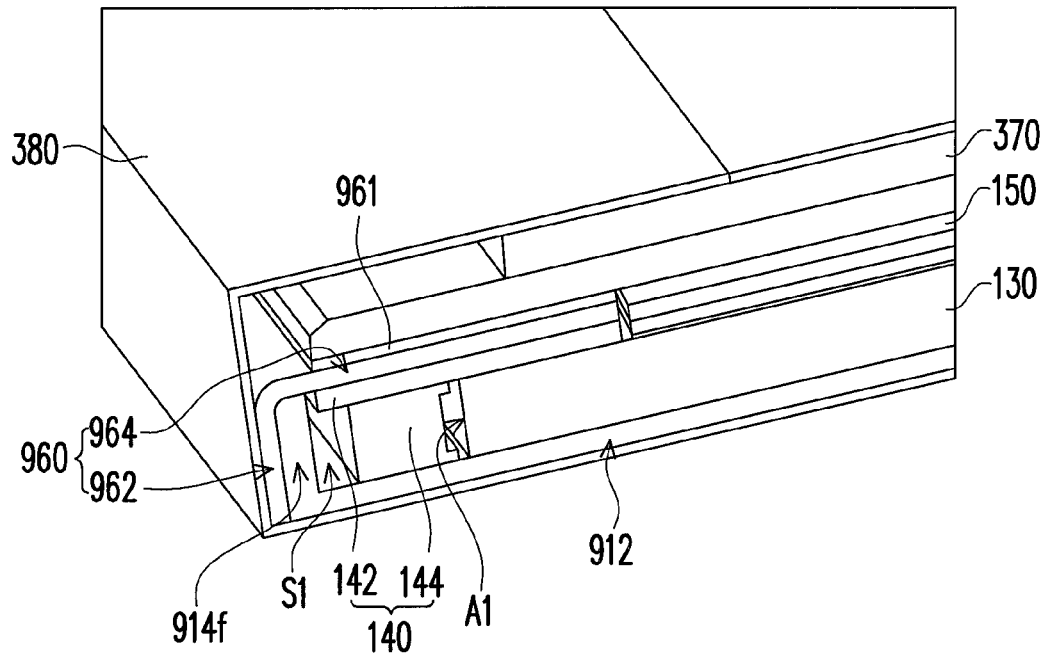
FIG. 14 is a partial cross-sectional view illustrating the LCD module depicted in FIG. 13.

FIG. 14 is a partial cross-sectional view illustrating the LCD module depicted in FIG. 13. With reference to FIG. 13 and FIG. 14, the LCD module 900 further includes a holder 960 substantially in an L shape. The holder 960 is assembled to the lighting device 140, and the holder 960 and the lighting device 140 that are already assembled are then again assembled to the light incident side A1 of the light guide plate 130. The holder 960 is adhered to the LCD panel 370 by an adhesive layer 961 formed on the holder 960. Thereby, the holder 960 and the sixth wall portion 914f of the side wall 914 lean against each other, such that the structural strength of the tray 910 can be enhanced.

To be more specific, the holder 960 includes a first leaning wall 962 and a second leaning wall 964. The first leaning wall 962 is substantially parallel to and leans against the sixth wall portion 914f. The second leaning wall 964 extends from the first leaning wall 962 to the light incident side A1 of the light guide plate 130. Besides, the second leaning wall 964 and the fourth wall portion 914d of the tray 910 together hold the LCD panel 370. A light source accommodation space S1 is formed between the second leaning wall 964, the bottom plate 912, and the sixth wall portion 914f, such that the holding board 142 disposed on the second leaning wall 964 and the LED 144 located on the holding board 142 can be accommodated in the light source accommodation space S1. The light incident side A1 of the light guide plate 130 is clamped by the second leaning wall 964 and the bottom plate 912 of the tray 910, such that the LED 144 emits light toward the light incident side A1 of the light guide plate 130.

Figure 15:
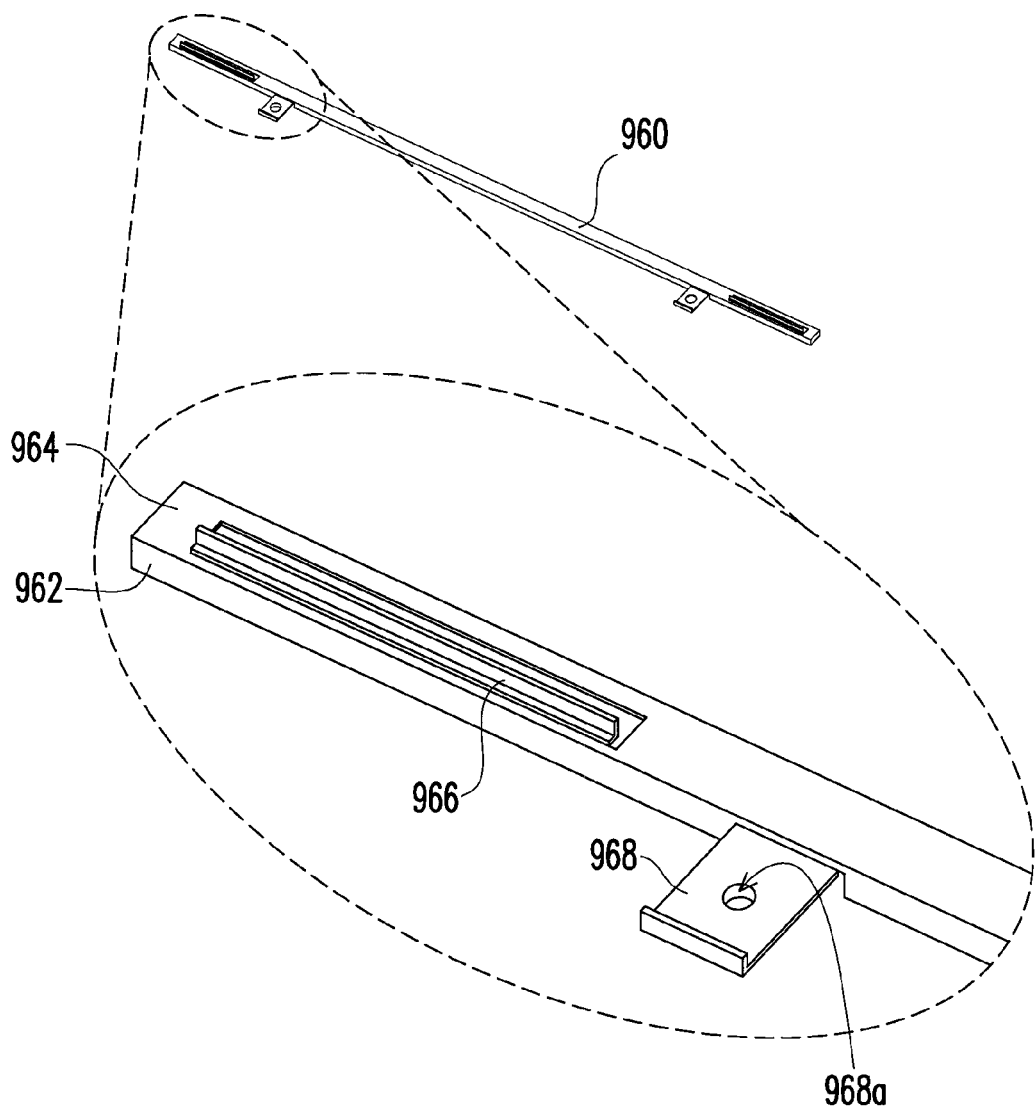
FIG. 15 is a schematic enlarged view illustrating a holder in the LCD module depicted in FIG. 13.
Figure 16A:
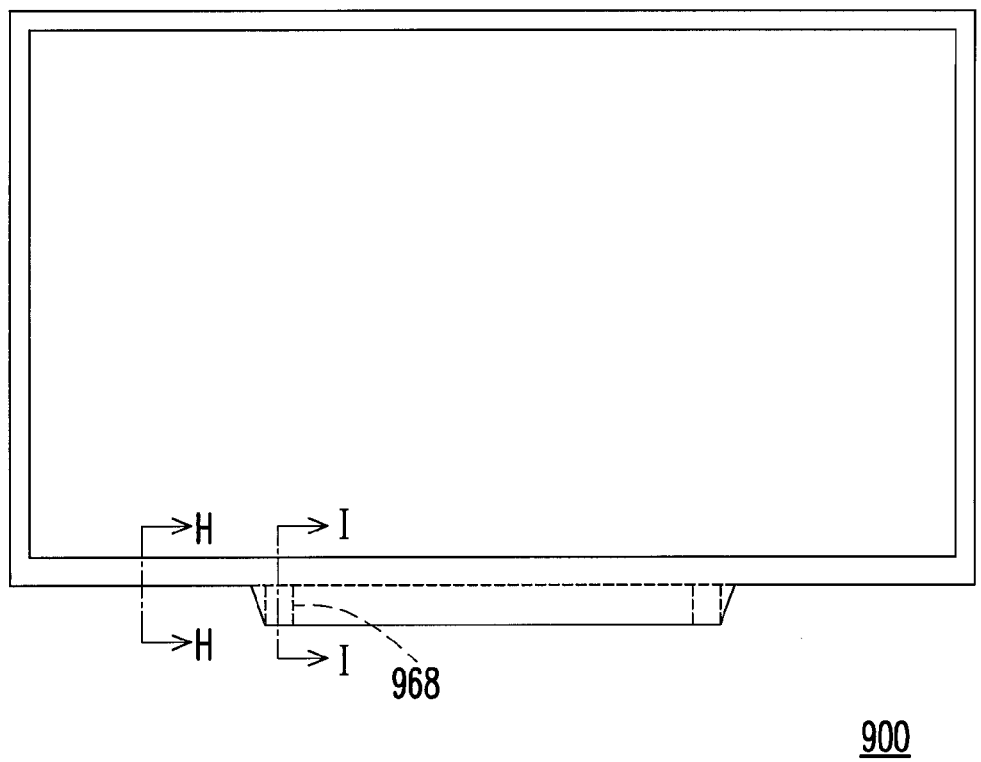
FIG. 16A is a top view illustrating the LCD module depicted in FIG. 13.
Figure 16B:
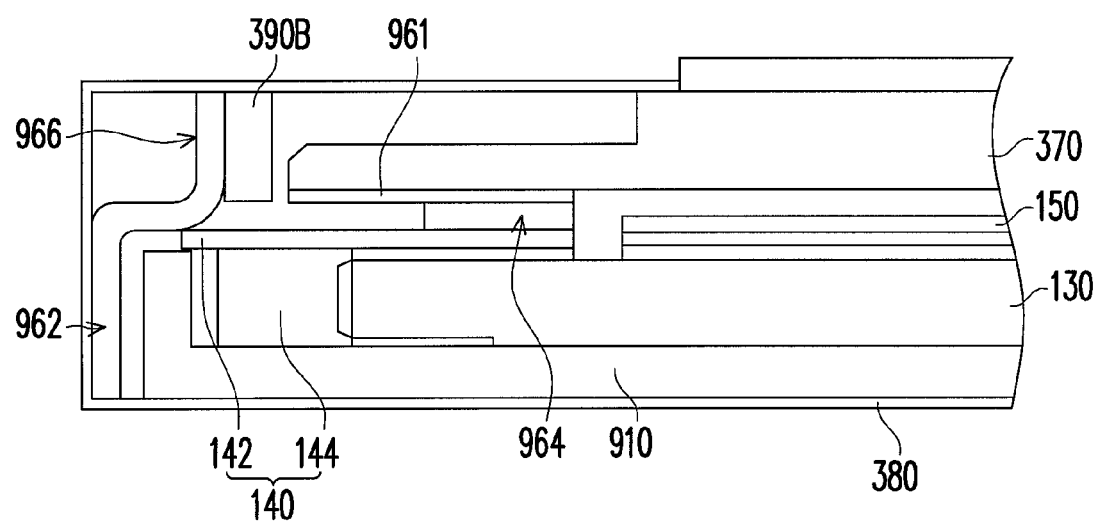
FIG. 16B and FIG. 16C are cross-sectional views illustrating the LCD module depicted in FIG. 16A respectively along a line segment H-H and a line segment I-I.
Figure 16C:
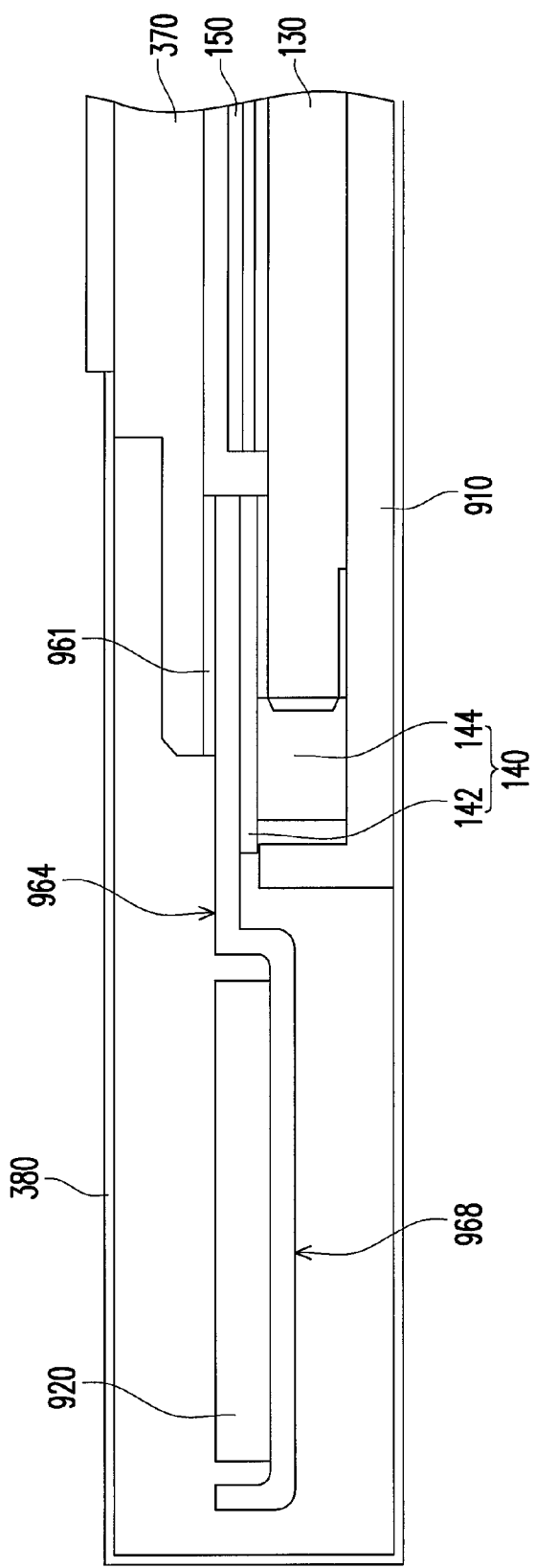

FIG. 15 is a schematic enlarged view illustrating a holder in the LCD module depicted in FIG. 13. FIG. 16A is a top view illustrating the LCD module depicted in FIG. 13. FIG. 16B and FIG. 16C are cross-sectional views illustrating the LCD module depicted in FIG. 16A respectively along a line segment H-H and a line segment I-I. With reference to FIG. 15 and FIG. 16A to FIG. 16C, in this embodiment, the holder 960 has a stop board 966 which is formed by hollowing out and bending a portion of the second leaning wall 964 of the holder 960, for instance.

Moreover, the LCD module 900 further includes a circuit board 920 electrically connected to the LCD panel 370 (depicted in FIG. 13). The holder 960 further has a holding portion 968 that is parallel to the second leaning wall 964 and extends toward a direction away from the LCD panel 370. The circuit board 920 is disposed on the holding portion 968. The holding portion 968 of this embodiment has a locking hole 968a, so as to lock the holding portion 968 and the circuit board 920 together, which should not be construed as a limitation to this embodiment. Similar to the embodiment depicted in FIG. 12, the LCD module 900 of this embodiment also utilizes the second cushion material 390B disposed between the stop board 966 and the LCD panel 370 for preventing damages caused by collision between the LCD panel 370 and the holder 960.

Figure 17:
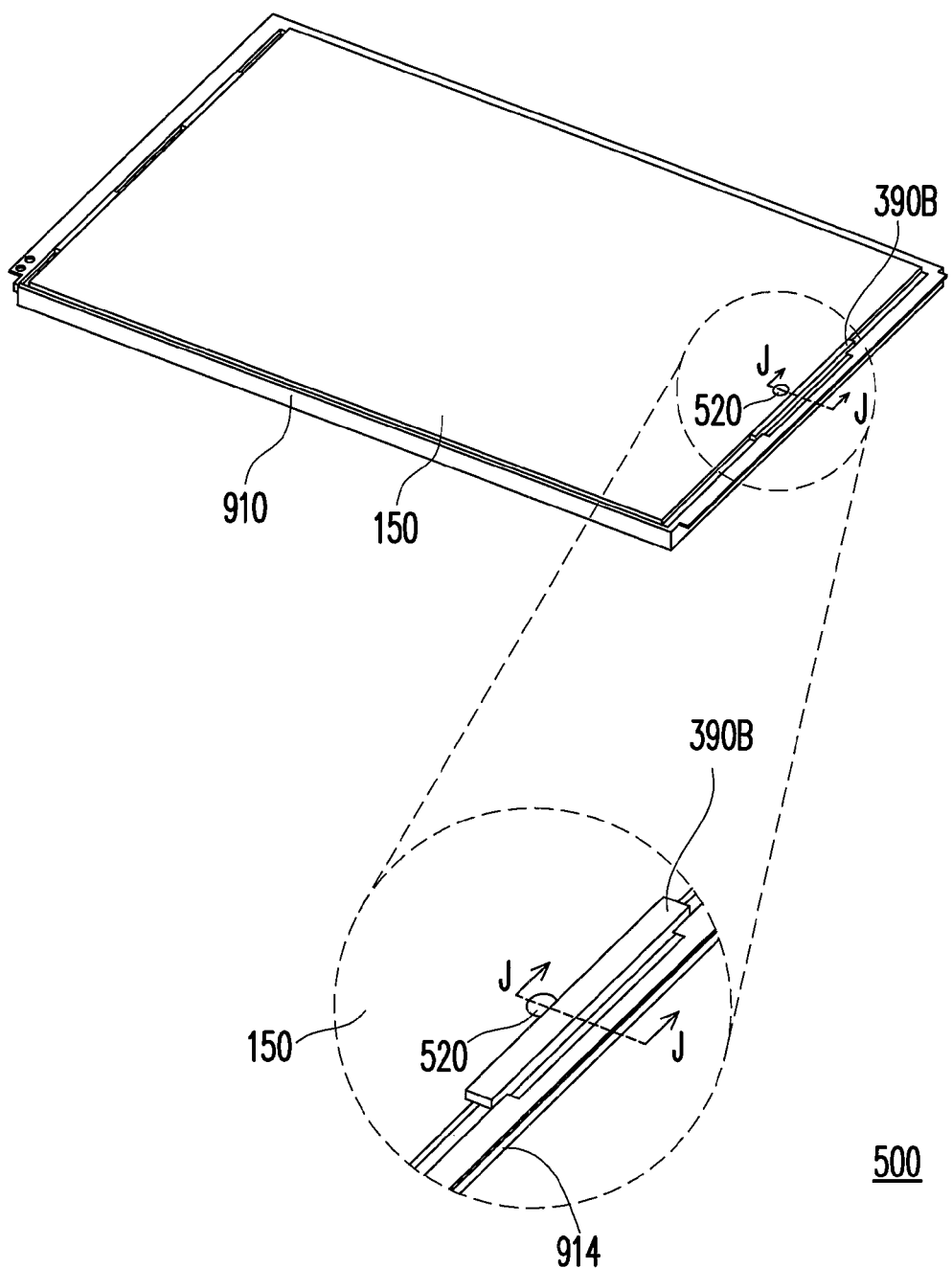
FIG. 17 is a schematic view illustrating assembly of partial components in the LCD module depicted in FIG. 13.
Figure 18:
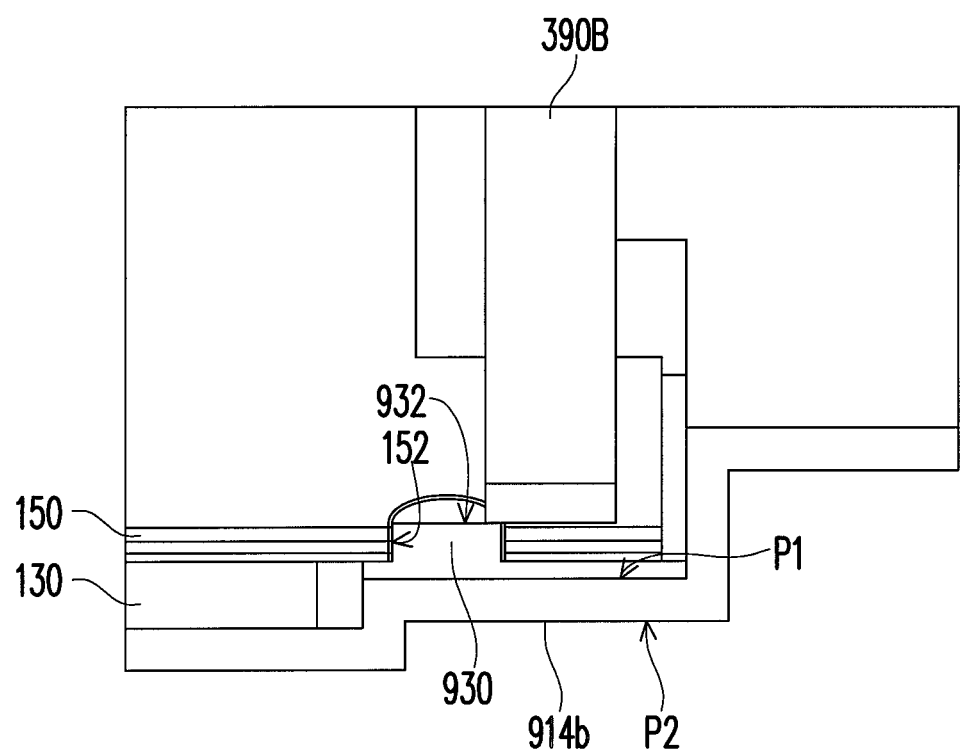
FIG. 18 is a partial cross-sectional view illustrating the LCD module depicted in FIG. 17 along a line segment J-J.

FIG. 17 is a schematic view illustrating assembly of partial components in the LCD module depicted in FIG. 13. FIG. 18 is a partial cross-sectional view illustrating the LCD module depicted in FIG. 17 along a line segment J-J. With reference to FIG. 17 and FIG. 18, the second wall portion 914b of the side wall 914 has a first surface P1 and a second surface P2 opposite to the first surface P1, and the optical film set 150 is located on the first surface P1. Note that the backlight module 900 further includes a positioning element 930 disposed between the optical film set 150 and the first surface P1. The positioning element 930 has a positioning protrusion 932, and the optical film set 150 correspondingly has a positioning hole 150. When the optical film set 150 is disposed on the first surface P1, the positioning protrusion 932 is located in the positioning hole 152, such that the optical film set 150 is positioned on the second wall portion 914b of the tray 910.

In this embodiment, the positioning element 930, for, example, is made of Mylar, which is not limited in the invention.

Figure 19:
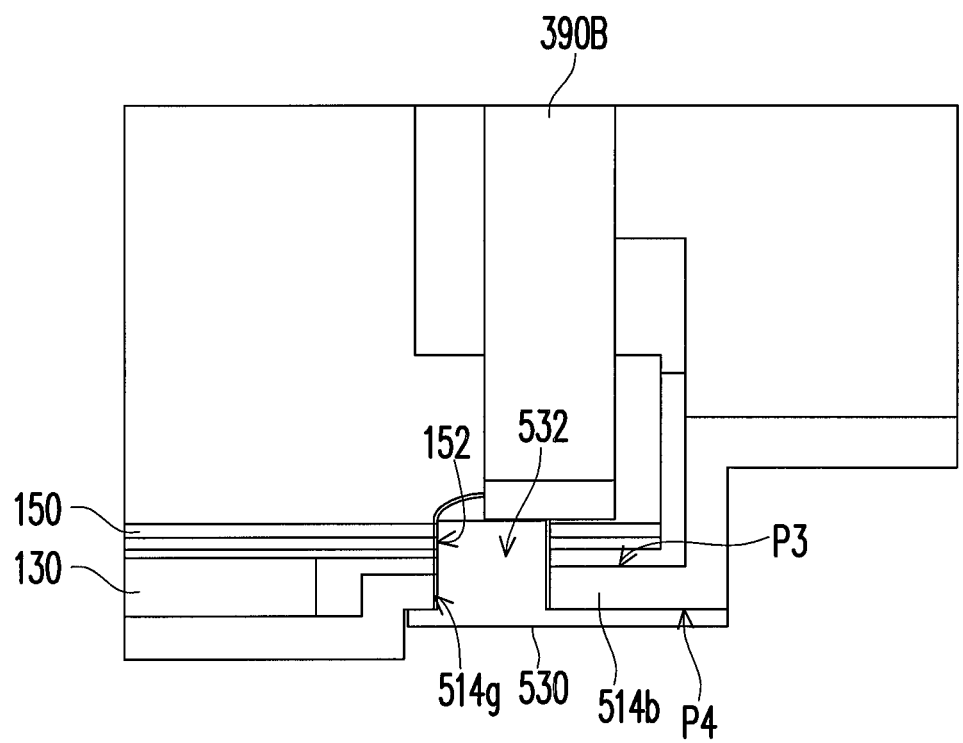
FIG. 19 is a partial cross-sectional view illustrating an LCD module according to another embodiment of the invention.

FIG. 19 is a partial cross-sectional view illustrating an LCD module according to another embodiment of the invention. Different from the above embodiment, the embodiment depicted in FIG. 19 indicates that the second wall portion 514b has a through hole 514g communicating a first surface P3 and a second surface P4. The positioning element 530 is located on the second surface P4, and the positioning protrusion 532 of the positing element 530 passes through the through hole 514g and protrudes from the first surface P3. When the optical film set 150 is disposed on the first surface P3, the positioning protrusion 532 is located in the positioning hole 152 of the optical film set 150, such that the optical film set 150 can be positioned on the second wall portion 514b.

Here, the optical film set 150 which is positioned on the tray 110 or on the tray 910 is not limited to be used in the backlight modules 100 and 200 and the LCD modules 300 and 900 of this invention. Namely, the optical film set 150 and the positioning elements 530 and 930 can also be used in various conventional backlight modules and conventional LCD modules.

In light of the foregoing, the integrated tray described in the above embodiments is employed in the backlight module of the invention in replacement of the conventional reflective film and the iron back frame. By means of the material properties of the integrated tray, favorable structural strength and performance of the backlight module can be ensured, fewer components are required, and assembling difficulty and manufacturing costs can both be reduced.

Moreover, after assembly of the integrated tray and the back frame, the bottom surface of the tray and the bottom surface of the back frame are coplanar, and thereby the thickness of the backlight module is reduced. Namely, compactness of the LCD module can be guaranteed.

In addition, the holder, the lighting device, and the tray are combined at the light incident side of the light guide plate, such that the structural strength of the integrated tray is further enhanced.

What is more, the positioning element made of Mylar is used in the integrated tray of the invention, so as to position the optical film set onto the side wall of the tray. As such, the positioning capability of the optical film set can be maintained when the miniaturized tray is applied in the backlight module and the LCD module.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A backlight module comprising:
a tray comprising a bottom plate and a side wall connecting an edge of the bottom plate, the side wall comprising:
a first wall portion substantially perpendicular to the bottom plate;
a second wall portion substantially parallel to the bottom plate, the second wall portion extending out of the tray;
a third wall portion substantially perpendicular to the bottom plate, the second wall portion being connected between the first wall portion and the third wall portion;
a fourth wall portion substantially parallel to the bottom plate, the fourth wall portion extending out of the tray;
a fifth wall portion substantially perpendicular to the bottom plate, the fourth wall portion being connected between the third wall portion and the fifth wall portion;
a light guide plate disposed on the bottom plate of the tray;
a back frame surrounding the tray, the back frame and the tray leaning against each other, a bottom surface of the tray and a bottom surface of the back frame being substantially coplanar;
a lighting device disposed at a light incident side of the light guide plate; and
an optical film set disposed on the light guide plate, the second wall portion leaning against the optical film set.

2. The backlight module as claimed in claim 1, wherein the side wall of the tray surrounds the light guide plate but exposes the light incident side of the light guide plate.

3. The backlight module as claimed in claim 1, the back frame comprising:
a bottom plate substantially coplanar with the bottom plate of the tray, the bottom plate of the back frame surrounding the bottom plate of the tray; and
a side wall perpendicular to the bottom plate of the back frame, the side wall of the back frame connecting the bottom plate of the back frame and surrounding the side wall of the tray.

4. The backlight module as claimed in claim 3, further comprising a cushion material leaning between the bottom plate of the back frame and the second wall portion of the side wall of the tray or between the bottom plate of the back frame and the fourth wall portion of the side wall of the tray.

5. The backlight module as claimed in claim 4, wherein the cushion material is adhesive, so as to adhere the bottom plate of the back frame and the side wall of the tray.

6. The backlight module as claimed in claim 3, wherein a side of the side wall of the back frame away from the bottom plate of the back frame is bent toward the light guide plate and forms a supporting wall portion, and the supporting wall portion is substantially parallel to the bottom plate of the back frame and leans against the second wall portion or the fourth wall portion of the side wall of the tray.

7. The backlight module as claimed in claim 3, wherein the side wall of the back frame has a first portion corresponding to the light incident side of the light guide plate, a side of the first portion away from the bottom plate of the back frame is bent toward the light guide plate and forms a clamping wall portion, a light source accommodation space is formed between the clamping wall portion and the bottom plate of the back frame, and the light incident side of the light guide plate is inserted into the light source accommodation space.

8. The backlight module as claimed in claim 7, wherein the lighting device is located in the light source accommodation space and disposed on the clamping wall portion.

9. The backlight module as claimed in claim 1, the side wall of the tray surrounding the light guide plate, the side wall of the tray located at the light incident side comprising a sixth wall portion substantially perpendicular to the bottom plate of the tray, a height of a top of the sixth wall portion relative to a height of the bottom plate of the tray being substantially less than a height of a top of the third wall portion relative to the height of the bottom plate of the tray, the backlight module further comprising a holder located at the light incident side and leaning against the sixth wall portion.

10. The backlight module as claimed in claim 9, the holder comprising:
a first leaning wall substantially parallel to the sixth wall portion, the first leaning wall leaning against the sixth wall portion; and
a second leaning wall extending from the first leaning wall to the light incident side of the light guide plate, the second leaning wall and the fourth wall portion of the tray together holding a liquid crystal display panel, a light source accommodation space being formed between the second leaning wall, the bottom plate of the tray, and the sixth wall portion, the light incident side of the light guide plate being clamped by the second leaning wall and the bottom plate of the tray.

11. The backlight module as claimed in claim 10, wherein the lighting device comprises a holding board and a light emitting device, the holding board is disposed on the second leaning wall, and the light emitting device is disposed on the holding board and emits a light beam into the light guide plate.

12. The backlight module as claimed in claim 1, the second wall portion having a first surface and a second surface opposite to the first surface, the optical film set being located on the first surface, the backlight module further comprising a positioning element disposed between the optical film set and the first surface, wherein the positioning element has a positioning protrusion, the optical film set has a positioning hole, and the positioning protrusion is located in the positioning hole.

13. The backlight module as claimed in claim 1, the second wall portion having a first surface, a second surface opposite to the first surface, and a through hole communicating the first surface and the second surface, the optical film set being located on the first surface, the backlight module further comprising:
a positioning element disposed on the second surface and having a positioning protrusion passing through the through hole and protruding from the first surface, the positioning protrusion being located in a positioning hole of the optical film set.

14. A liquid crystal display module comprising:
a tray comprising a bottom plate and a side wall connecting an edge of the bottom plate, the side wall comprising:
a first wall portion substantially perpendicular to the bottom plate;
a second wall portion substantially parallel to the bottom plate, the second wall portion extending out of the tray;
a third wall portion substantially perpendicular to the bottom plate, the second wall portion being connected between the first wall portion and the third wall portion;
a fourth wall portion substantially parallel to the bottom plate, the fourth wall portion extending out of the tray;
a fifth wall portion substantially perpendicular to the bottom plate, the fourth wall portion being connected between the third wall portion and the fifth wall portion;

a light guide plate disposed on the bottom plate of the tray;

a lighting device disposed at a light incident side of the light guide plate;

an optical film set disposed on the light guide plate, the second wall portion leaning against the optical film set;

a liquid crystal display panel disposed over the optical film set, the fourth wall portion leaning against the liquid crystal display panel; and a flexible encapsulating material covering a portion of the liquid crystal display panel and a portion of the bottom plate of the tray, so as to fix the liquid crystal display panel and the tray together.

15. The liquid crystal display module as claimed in claim 14, wherein the side wall of the tray surrounds the light guide plate but exposes the light incident side of the light guide plate, and the backlight module further comprises:

a back frame surrounding the tray, the back frame and the tray leaning against each other, a bottom surface of the tray and a bottom surface of the back frame being substantially coplanar, wherein the flexible encapsulating material surrounds the back frame and fixes the liquid crystal display panel, the back frame, and the tray together.

16. The liquid crystal display module as claimed in claim 15, the back frame comprising:

a bottom plate substantially coplanar with the bottom plate of the tray, the bottom plate of the back frame surrounding the bottom plate of the tray; and a side wall perpendicular to the bottom plate of the back frame, the side wall of the back frame connecting the bottom plate of the back frame and surrounding the side wall of the tray.

17. The liquid crystal display module as claimed in claim 16, further comprising a first cushion material leaning between the bottom plate of the back frame and the second wall portion of the side wall of the tray or between the bottom plate of the back frame and the fourth wall portion of the side wall of the tray.

18. The liquid crystal display module as claimed in claim 17, wherein the first cushion material is adhesive, so as to adhere the bottom plate of the back frame and the side wall of the tray.

19. The liquid crystal display module as claimed in claim 16, wherein a side of the side wall of the back frame away from the bottom plate of the back frame is bent toward the light guide plate and forms a supporting wall portion, and the supporting wall portion is substantially parallel to the bottom plate of the back frame and leans against the second wall portion or the fourth wall portion of the side wall of the tray.

20. The liquid crystal display module as claimed in claim 16, wherein the side wall of the back frame has a first portion corresponding to the light incident side of the light guide plate, a side of the first portion away from the bottom plate of the back frame is bent toward the light guide plate and forms a clamping wall portion, a light source accommodation space is formed between the clamping wall portion and the bottom plate of the back frame, the light incident side of the light guide plate is inserted into the light source accommodation space, and the liquid crystal display panel is disposed on the clamping wall portion.

21. The liquid crystal display module as claimed in claim 20, wherein the lighting device is located in the light source accommodation space and disposed on the clamping wall portion.

22. The liquid crystal display module as claimed in claim 20, further comprising:

a holder disposed on the back frame and located at the light incident side of the light guide plate; and a second cushion material disposed on the clamping wall portion of the side wall of the back frame and leaning between the holder and the liquid crystal display panel.

23. The liquid crystal display module as claimed in claim 22, wherein the holder has a holding board extending toward a direction away from the lighting device, and the second cushion material is located between the stop board and the liquid crystal display panel.

24. The liquid crystal display module as claimed in claim 14, the side wall of the tray surrounding the light guide plate, the side wall of the tray located at the light incident side comprising a sixth wall portion substantially perpendicular to the bottom plate of the tray, a height of a top of the sixth wall portion relative to a height of the bottom plate of the tray being substantially less than a height of a top of the third wall portion relative to the height of the bottom plate of the tray, the backlight module further comprising a holder located at the light incident side and leaning against the sixth wall portion, the flexible encapsulating material encapsulating and fixing the liquid crystal display panel, the back frame, and the tray together.

25. The liquid crystal display module as claimed in claim 24, the holder comprising:

a first leaning wall being substantially parallel to and leaning against the sixth wall portion; and a second leaning wall extending from the first leaning wall to the light incident side of the light guide plate, the second leaning wall and the fourth wall portion of the tray together holding the liquid crystal display panel, a light source accommodation space being formed between the second leaning wall, the bottom plate of the tray, and the sixth wall portion, the light incident side of the light guide plate being clamped by the second leaning wall and the bottom plate of the tray, the lighting device being located in the light source accommodation space.

26. The liquid crystal display module as claimed in claim 25, wherein the lighting device comprises a holding board and a light emitting device, the holding board is disposed on the second leaning wall, and the light emitting device is disposed on the holding board and emits a light beam into the light guide plate.

27. The liquid crystal display module as claimed in claim 25, the holder further comprising an adhesive layer disposed between the second leaning wall and the liquid crystal display panel.

28. The liquid crystal display module as claimed in claim 24, wherein the holder has a holding board extending toward a direction away from the lighting device and located around the liquid crystal display panel.

29. The liquid crystal display module as claimed in claim 28, further comprising a cushion material disposed between the stop board and the liquid crystal display panel.

30. The liquid crystal display module as claimed in claim 24, wherein the holder further comprises a holding portion parallel to the second leaning wall and extending toward a direction away from the liquid crystal display panel, and the liquid crystal display module further comprises a circuit board electrically connected to the liquid crystal display panel and disposed on the holding portion.

31. The liquid crystal display module as claimed in claim 14, the second wall portion having a first surface and a second surface opposite to the first surface, the optical film set being located on the first surface, the backlight module further comprising:

a positioning element disposed between the optical film set and the first surface, the positioning element having a positioning protrusion, the optical film set having a positioning hole, the positioning protrusion being located in the positioning hole.

32. The liquid crystal display module as claimed in claim 14, the second wall portion having a first surface, a second surface opposite to the first surface, and a through hole communicating the first surface and the second surface, the optical film set being located on the first surface, the backlight module further comprising:

a positioning element disposed on the second surface and having a positioning protrusion passing through the through hole and protruding from the first surface, the positioning protrusion being located in a positioning hole of the optical film set.

* * * * *